United States Patent Office 3,174,892
Patented Mar. 23, 1965

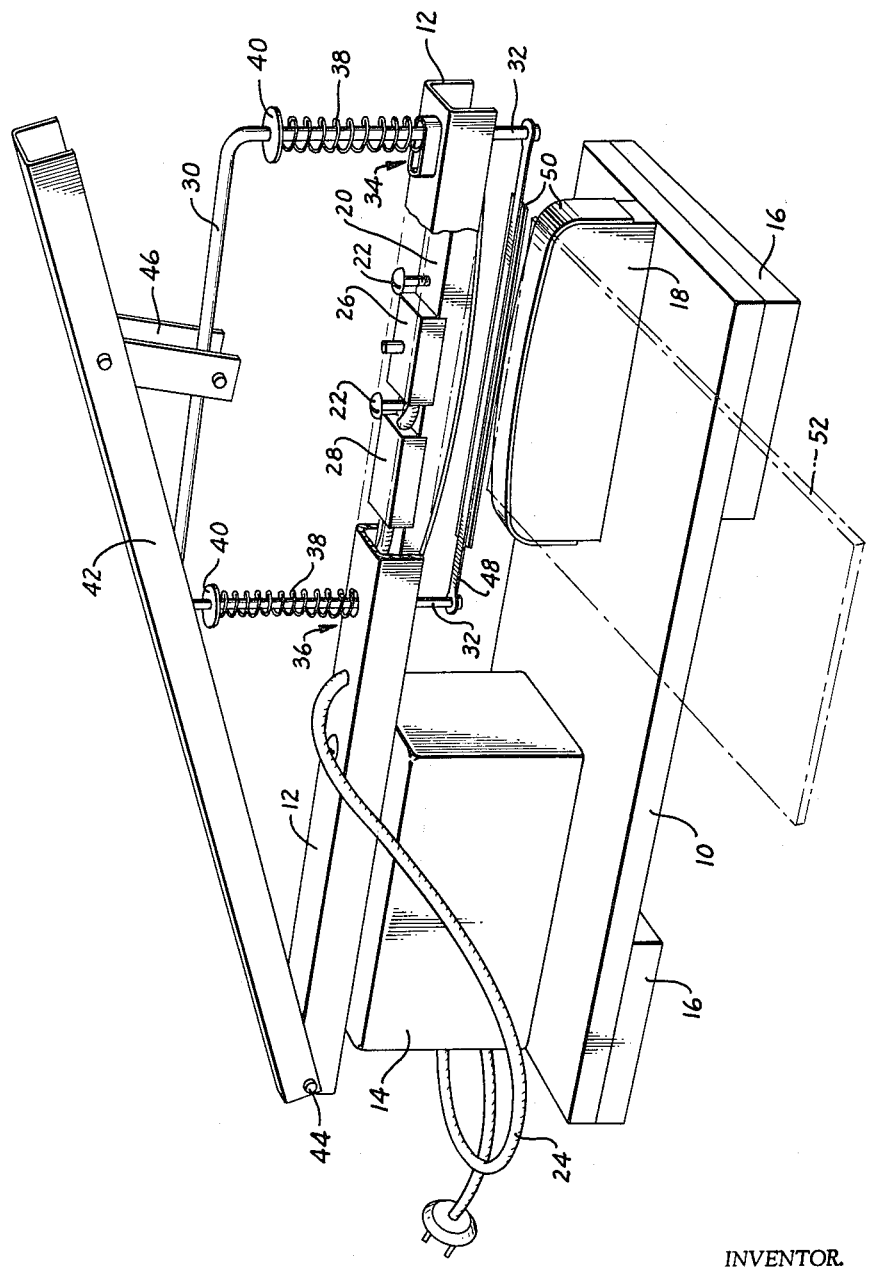

3,174,892
APPARATUS FOR BONDING THERMOPLASTIC MATERIALS WITH RESIDUAL HEAT
Edwin C. Fichtner, Burlingame, Calif., assignor to Wells Manufacturing Co., South San Francisco, Calif., a corporation of California
Filed Mar. 2, 1962, Ser. No. 176,930
5 Claims. (Cl. 156—583)

This invention relates to an apparatus for bonding together a plurality of portions of thermoplastic material and more specifically to an apparatus for sealing polyethylene bags and the like.

In the marketing of many types of merchandise, the merchandise is wrapped or bagged with thin films so that the merchandise is kept clean and, in the case of foodstuffs, hermetically sealed until it is ultimately sold. Very thin transparent films made of thermoplastic materials such as polyethylene and polystyrene are often used for these purposes because they are relatively inexpensive and because they permit the merchandise to be viewed prior to sale even though they are wrapped.

In the packaging of goods with these films many difficulties are often encountered in making good seals between different laminae or portions of the thermoplastic material because the thin films melt instead of merely soften and are then pressed into seams which are excessively thin and even discontinuous.

In prior methods and apparatus for sealing packages of these kinds a heating element or iron is brought into contact with the thermoplastic material, and because of these problems, the prior methods and apparatus have required extremely accurate control of the temperatures of the sealing irons. Where the iron is too cold, no seal is made, and where the iron is too hot, the thermoplastic material melts and produces extremely thin and/or discontinuous seams. Furthermore, problems have been encountered in making consistently good seals even where the iron has been maintained at ideal temperatures. Where it is desirable to accomplish the sealing operation rapidly, it is desirable to maintain the temperature of the heating element slightly above the softening or sealing temperature of the thermoplastic so that a sealed seam will be made rapidly as soon as the element contacts the thermoplastic; here, however, time controls become important, and the iron must be removed from the thermoplastic rapidly to prevent the thermoplastic from being heated too much. Even where the temperature of the sealing iron is kept low, care must be taken that excessive pressure is not applied to the iron because excessively thin and broken seams may then be made.

For these reasons it has been necessary to provide very accurate and expensive machines to perform the task of sealing thermoplastic packaging materials where consistently good seals must be made in a rapid processing operation.

It is a principal object of this invention to provide an apparatus for bonding portions of thermoplastic materials rapidly and efficiently while producing thermoplastic bonds of uniform and consistent high quality.

It is another object of the invention to provide such an apparatus of extreme simplicity with which high quality thermoplastic seals can be produced at minimum cost and with a minimum investment in equipment.

It is another object of the invention to provide such an apparatus which is adapted for use in both uncontrolled manual operations and in automatic machinery for sealing packages rapidly in a line of merchandise packaging machinery.

It is a more specific object of the invention to provide apparatus for sealing thermoplastic packages in which excessive heating of the thermoplastic materials may be prevented without requiring care or automatic controls to limit the time during which a heating element is in contact with the thermoplastic materials.

It is another object of the invention to provide such apparatus in which extremely accurate thermostatic controls need not be used.

It is another object of the invention to provide such apparatus with which thermoplastic seals or bonds can be produced very rapidly by contacting the thermoplastic with a heater element the temperature of which, at initial contact, may be substantially above the softening point of the thermoplastic material and above the temperature to which the thermoplastic material should be permitted to rise if a good bond is to be produced.

Other objects and advantages of the invention will become apparent from the following description read in conjunction with the attached drawing in which apparatus constructed according to this invention for practising the method of the invention is illustrated in perspective.

In the drawing, the apparatus shown for bonding thermoplastic materials includes a frame having a base 10 and an overhead support arm 12 mounted on the base 10 by a spacer block 14. A pair of feet 16 may be attached to the bottom of the base 10. An anvil 18, consisting of a wooden block having a convex upper surface, is mounted on the base 10 under the arm 12. An electrical heater element 20 having a convex lower surface is mounted on the under side of the arm 12 directly over the anvil 18 by means of screws 22, and the heater element 20 is connected to an electrical cord 24 through a push button switch 26 and a thermostatic switch 28. The thermostatic switch 28 is illustrated as a simple unadjustable switch which will open whenever the heater element 20 reaches a predetermined temperature; an adjustable thermostatic switch could be used but is not necessary for most applications since very accurate control of temperature is not essential to efficient performance of the apparatus in the method of the invention. It should be noted that the arm 12 is provided with side flanges which cover the major part of the sides of the heating element 20 and prevent accidental contact between the heater element and thermoplastic materials being inserted into the apparatus.

A yoke having a top 30 and legs 32 is mounted on the arm 12 with the legs 32 passing through holes 34 and 36 in the arm 12. The hole 36 is preferably formed as an elongated cylinder extending through the arm 12 to guide the leg 32 therein along a vertical path. Compression springs 38 are mounted on the legs 32 between the arm 12 and washers 40 near the top of the yoke for holding the yoke upwardly. A handle 42 is pivotally connected to the arm 12 by a pin 44 and contacts the yoke immediately above the cylindrical hole 36 for reciprocating the yoke. A bracket 46 interconnects the handle 42 and the top 30 of the yoke for limiting upward movement of the handle with respect to the yoke.

A thin flexible metal strip 48 is connected under tension between the lower ends of the arms 32 of the yoke to be reciprocated between the heater element 20 and anvil 18 responsive to reciprocation of the handle 42 and yoke. The strip 48 is made as light in weight as possible while insuring its structural strength so that its heat capacity will be very small. In this regard the term "heat capacity" is used as it is defined in Hackh's Chemical Dictionary, 3rd edition (1944), as meaning the amount of heat required to raise the temperature of the strip 48 one degree, or in other words, the mass of the strip 48 times its specific heat. As explained hereinafter it is very desirable that the heat capacity of the strip be very low so that high quality seals can be made between thermoplastic materials consistently. A pair of strips of material 50 are mounted on the adjacent sides of the strip 48 and anvil 18 for preventing thermoplastic materials from sticking to the respective members. A suitable material from which the strips 50 may be made is glass cloth impregnated with poly-tetrafluoroethylene.

While the strip 48 is preferably made flexible and reciprocated between convex surfaces on the heater and anvil, the strip may be reciprocated between flat or concave surfaces, preferably employing backing means to press the center of the strip against the thermoplastic material; the strip may be reciprocated into a chamber in the heating element for the heating part of its cycle; the strip 48 may be made flat and rigid as where an annular strip is to be employed for sealing the periphery of a container, etc.

Operation

In operation of the apparatus shown in the drawing in practicing the method of this invention, the electrical cord 24 is plugged in and the switch 26 turned on so that the heater element 20 heats up to the temperature at which the thermostatic switch 28 opens. This temperature will be above the softening point of the thermoplastic material to be bonded and it may be substantially above the softening point particularly where the strip 48 has a very small heat capacity and/or the quantity of thermoplastic material to be bonded is large. In this condition, the heater element 20 functions as a heat reservoir from which small discrete quantities of heat may be taken by the strip 48 and transported to the anvil 18.

If at the start of a cycle of operation the yoke and strip 48 are in the position illustrated in the drawing, the yoke and strip 48 are permitted to move upwardly under the action of springs 38 until the strip 48 contacts the under surface of the heater element 20. Such contact will cause the strip 48 to heat up to the temperature of the heater element 20. It should be noted that this heating will cause the strip 48 to expand and that the aperture 34 through which one of the legs 32 of the yoke passes is elongated to permit the legs 32 of the yoke to move apart and keep the strip 48 under tension. Additionally it should be noted that since the lower surface of the heater element 20 and the upper surface of the anvil 18 are convex, uniform contact of the strip 48 on the heater and anvil is effected and hence uniform heat transfer by the strip 48.

A plurality of portions or laminae of thermoplastic material to be bonded, such as the portions which surround the mouth of a thermoplastic bag 52 in the drawing, are then assembled and placed on the anvil. The handle 42 is then depressed to move the strip 48 downwardly out of contact with the heater element 20 and then into contact with the assembly of thermoplastic laminae on the anvil 18. In this manner the strip 48 transports a finite quantity of heat from the heat reservoir to the thermoplastic material, and the quantity of heat is small since the heat capacity of the strip 48 is small. Since the quantity of heat transferred by the strip 48 is small, excessive melting of the thermoplastic material is prevented regardless of the amount of time the strip 48 is in contact with the thermoplastic material, while on the other hand, the heat is transferred at a high temperature so that sufficient localized melting occurs to effect a good bond between the laminae of thermoplastic material. When a seal is effected in this manner the handle 42 may be released to return the strip 48 to the heater element 20 so that the strip picks up another small finite quantity of heat for the next seal.

It should be noted that this apparatus and method may be used for making a large number of seals very rapidly while bonds of consistent high quality are made. During the process the temperature of the strip 48 fluctuates rapidly, but the rapid fluctuation of temperature can be accomplished easily since the strip 48 conducts heat rapidly and since such small quantities of heat are transferred for each temperature fluctuation. Additionally, rapid operation is facilitated by making the anvil 18 out of a material such as wood which has a low coefficient of thermal conductivity so that heat transfer from the strip 48 to the anvil 18 is minimized and the anvil does not become hot enough itself to soften or melt the thermoplastic material.

Obviously many modifications in the method described above can be made without departing from the spirit and scope of the invention and many different forms of apparatus can be used for transferring small finite quantities of heat at high temperature in the method described.

I claim:

1. Apparatus for bonding thermoplastic materials together which comprises:
   (A) a frame having
      (1) a sealing station thereon adapted to receive thermoplastic materials to be bonded and
      (2) a heating station thereon,
   (B) a heat conductor having a low heat capacity,
   (C) reciprocating means mounting said heat conductor on said frame for movement back and forth between said sealing and heating stations, and
   (D) heater means mounted at said heating station for engaging and heating said heat conductor only when said heat conductor is at said heating station.

2. Apparatus for bonding thermoplastic materials which comprises:
   (A) a frame having an anvil portion thereof on which thermoplastic materials to be bonded may be placed,
   (B) a heat reservoir mounted on said frame at a position remote from said anvil,
   (C) a heat conductor, and
   (D) means mounting said heat conductor on said frame for movement between said reservoir and said anvil.

3. The apparatus of claim 2 in which said anvil is made of a material having a low coefficient of thermal conductivity.

4. The apparatus of claim 3 in which said anvil and said reservoir have convex surfaces facing toward each other and between which said conductor is moved and said conductor is flexible.

5. Apparatus for bonding thermoplastic materials which comprises:
   (A) a frame having
      (1) a base and
      (2) an overhead support arm above said base,
   (B) an anvil mounted on said base under said overhead support arm and adapted to support an assembly of laminae of thermoplastic material to be bonded together with the top of said anvil being convex,
   (C) a thermostatically controlled heater member mounted on said overhead support arm above said anvil with said heater member having a convex bottom surface facing toward said convex top of said anvil,
   (D) a yoke mounted on said overhead support arm for generally vertical reciprocation and having a pair of leg portions below said support arm on opposite sides of said heater member,
   (E) a thin flexible strip of a heat conductive material connected between said leg portions of said yoke for movement between spaced apart positions in contact with said convex surfaces responsive to reciprocation of said yoke, and
   (F) spring means interconnecting said arm and said yoke for urging said yoke upwardly to a position where said conductor strip contacts said heater member.

References Cited by the Examiner

UNITED STATES PATENTS

| 2,562,821 | 7/51 | Rothweiler | 219—22 XR |
| 2,642,919 | 6/53 | Kingman | 219—19.10 |
| 2,833,683 | 5/58 | Quandt | 156—306 |
| 2,951,141 | 8/60 | Bernhardt | 219—19.10 |
| 3,040,154 | 6/62 | Marsh | 219—19.10 |
| 3,056,712 | 10/62 | Imhof | 156—306 |

EARL M. BERGERT, *Primary Examiner.*